June 22, 1965 A. HOHMANN 3,190,548

PUNCHED TAPE FEED

Filed June 5, 1963 4 Sheets-Sheet 1

INVENTOR.
ALBERT HOHMANN

BY James H. Conner

AGENT.

INVENTOR.
ALBERT HOHMANN
BY James H. Connor
AGENT.

INVENTOR.
ALBERT HOHMANN

BY [signature]

AGENT.

INVENTOR.
ALBERT HOHMANN
BY James H. Conner
AGENT.

United States Patent Office 3,190,548 Patented June 22, 1965

3,190,548
PUNCHED TAPE FEED

Albert Hohmann, Brooklyn, N.Y., assignor to Taller & Cooper, Inc., Brooklyn, N.Y., a corporation of New York Filed June 5, 1963, Ser. No. 285,773
3 Claims. (Cl. 234—128)

This invention relates generally to tape punches and in particular to a feed mechanism for advancing predetermined lengths of paper tape after the tape has been perforated by a block or gang punch.

Heretofore, tape punches generally perforated one row of data and advanced the tape a single row to receive the succeeding row of data. Each row of punching normally contained a unit of information. Therefore, the feed was essentially step-by-step feeding. The present invention applies to feeding a length of tape equal to a plurality of units of data rather than the conventional step-by-step single unit of data length. Further, length feeding to produce a continuously perforated tape required an accuracy of continuity equal to that existing in ratchet type step-by-step tape feeds, i.e.—the spacing between succeeding rows of data must be the same as the spacing between each individual row of data. Accordingly, one of the principal objects of the invention resides in the provision of means to accurately advance a data tape a predetermined length after said length has been block or gang perforated.

The present tape punch generally comprises a fixed base having a reciprocating die and punching chamber. To maintain tape feeding accuracy, the tape engaging feed spindle is mounted on and reciprocates with the reciprocating die and punching chamber.

Therefore, another object is to provide a novel tape feed that reciprocates with the reciprocating gang punch.

A common drive shaft is utilized to control the punch reciprocating means and the tape feeding means. The common drive shaft is uni-directionally rotatable and fixed in relation to the reciprocating punch and feeding means. Thus, a novel bi-directional feed mechanism drive is utilized to couple the common drive shaft to the reciprocating feed spindle.

Accordingly, still another object of the invention is to provide a bi-directional drive means that advances the tape uni-directionally in repetitive duplicating sequence.

In conventional step-by-step tape feeds, ratchet drive means are generally employed to advance the tape after each punching operation. The teeth on the ratchet are equidistantly spaced and thereby advance the tape equally with each incremental movement of the ratchet. In the matter of length feeding, the spacing between the last row of data perforations and the succeeding first row of data perforation must be equal to the spacing between the two adjacent rows of data perforations. The present invention provides means to accomplish this repetitive spacing accuracy standard.

Thus, yet another object resides in the provision of means to accurately index an advanced section of tape with the succeeding section of tape that is to be perforated.

Other ancillary objects will be in part hereinafter apparent and will be in part hereinafter pointed out.

Figure 1:
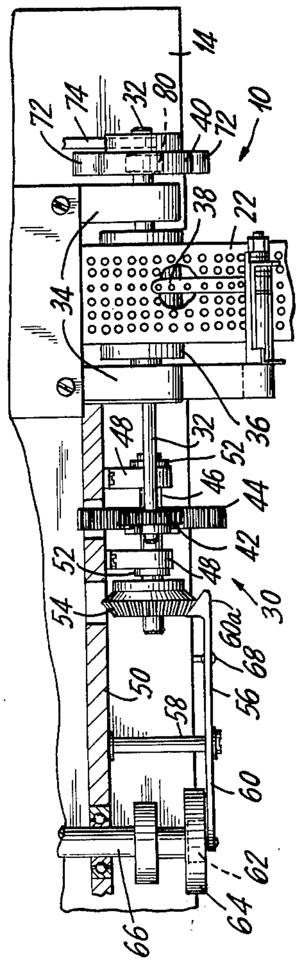
FIGURE 1 is a plan view of the tape feed mechanism.

Referring to the drawings in detail, 10 generally designates a tape punch having a base 12 affixed to a base plate 14. Mounted on base 12 is a plurality of rows of punch pins 16 selectively controlled by a plurality of rotary code wheels 18. The punch 10 is described and shown in detail in my co-pending application, Serial Number 334,350, filed December 30, 1963. Briefly, the lower die assembly 20, reciprocates to carry the paper tape 22 into engagement with pins 16. Those pins engaging the code protrusions 21 on code wheels 18 are restrained and perforate the tape 22 while those pins entering recesses in the code protrusions 21 are urged upwardly with the tape and do not perforate the tape 22.

Punch 10 is essentially a block or gang type punch wherein a plurality (sixteen) of rows of punches perforate the tape with a single reciprocating action of the lower die assembly 20. Thus, a length of tape 22 equal to the sixteen rows of data must be advanced from the punching chambers and an imperforate length must be fed into the punching chamber after each punching operation. Means are provided to feed the tape the exact predetermined length and directed toward this end is a tape feeding mechanism generally designated as 30. The mechanism 30 comprises a shaft 32 journalled in a pair of spaced bosses 34 extending from punch die assembly 20. Affixed to shaft 32 and disposed between bosses 34 is the spindle 36 having feed pins 38 centrally disposed around the periphery thereof. Secured to shaft 32 at one end thereof is a cam 40 provided for a purpose hereinafter appearing.

Secured to the opposite end of shaft 32 is a pinion 42 normally disposed in meshing engagement with a pinion 44 affixed to a shaft 46 journalled in bearing members 48 mounted on side plate 50. Side plate 50 is part of code wheel control mechanism, not shown, and is described in my co-pending application, Serial Number 334,350, filed December 30, 1963. Shaft 46 is rotatable in bearing members 48 and is secured against axial movement by means of a pair of spaced collars 52. Secured to and rotatable with shaft 46 is a bevel pinion 54 that is disposed in meshing engagement with a beveled sector gear 56. Sector gear 56 is pivotally mounted on a stud 58 extending from side plate 50. The sector gear 56 is provided with an end arm portion 60 disposed oppositely of the gear portion *60a*. Arm portion 60 has rotatably mounted thereon a follower roller 62 that rides upon the periphery of cam 64 rotatably mounted on and affixed to shaft 66. Shaft 66 is controlled by a one-revolution clutch, not shown, but described in my co-pending application Serial Number 334,350. It may be stated that shaft 66 makes one complete revolution with each punching operation.

Figure 9:
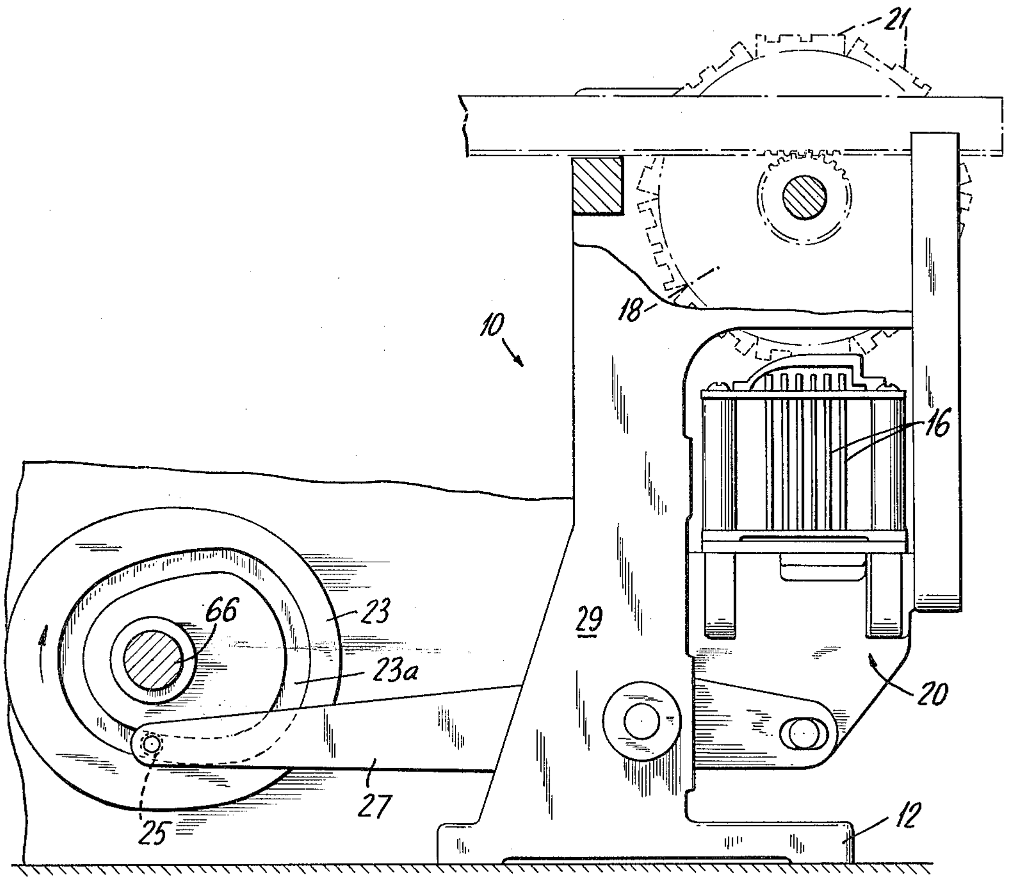
FIGURE 9 is a side elevation of the tape punch with the side frame plate omitted to illustrate the punch controlling cam.
Figure 10:
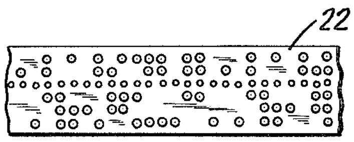
FIGURE 10 is a plan view of a portion of perforated tape illustrating the continuity of perforations.

While the operation of punch 10 is completely disclosed in application Serial Number 334,350, it may be briefly stated that a cam 23 FIGURE 9 affixed to and rotatable with shaft 66 controls a follower 25 that rides in grove *23a* in cam 23. Follower 25 is journalled on a stud secured to lever 27 that is pivotally mounted on frame 29 of punch 10. With each revolution of cam 23, reciprocating lever 27 is pivoted to raise die assembly 20 to perforate the tape and then restore the die assembly to its initial lower position. The punching operation occurs during the initial one hundred and eighty degrees of rotation of shaft 66 for reasons hereinafter appearing.

Figure 2:
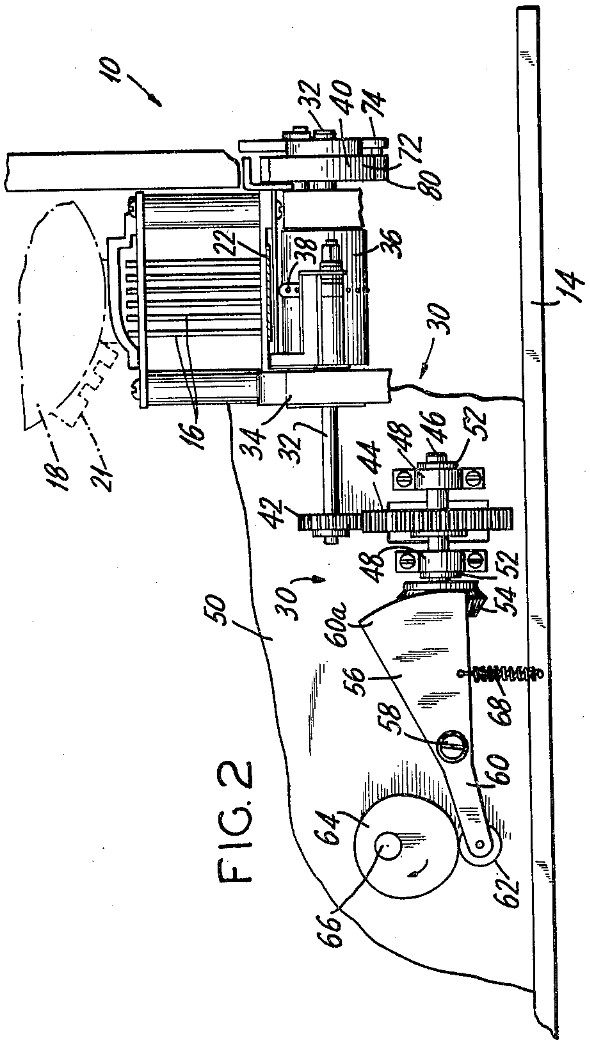
FIGURE 2 is a side elevation of the mechanism.
Figure 3:
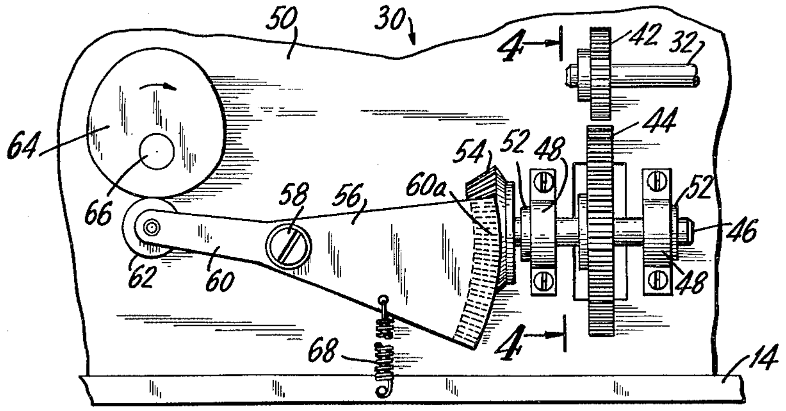
FIGURE 3 is a side view detail of the reciprocating drive means in normal half-cycle position.
Figure 5:
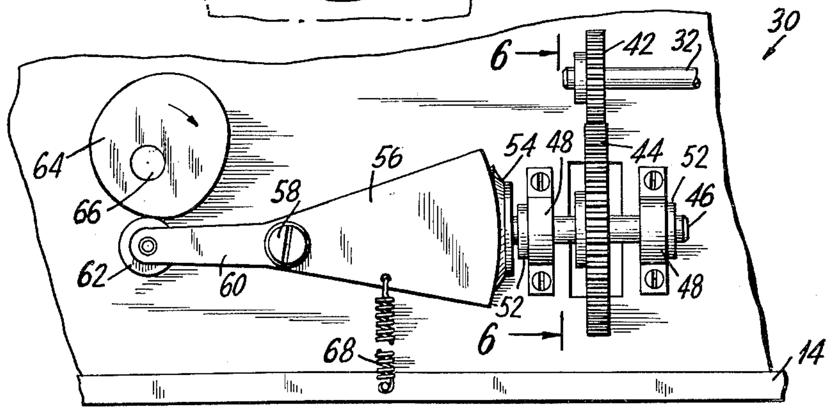
FIGURE 5 is a side view detail of the reciprocating drive means in substantially three-quarters cycle position.

Portion 60_a_ of gear sector 56 FIGURES 2, 3 and 5, has one end of a spring 68 secured thereto and the other end of spring 68 is anchored to base plate 14. Thus, roller 62 is continuously urged into engagement with the periphery of cam 64.

As shown in FIGURE 2, cam 64 is disposed in normal zero rotation position with the dwell portion centrally contacting follower roller 62. Spring 68 is extended and sector gear portion 60_a_ is disposed with beveled pinion 54 meshing with the lowermost portion of the beveled gear carried by portion 60_a_. Upon the initiation of a punching cycle, by means not shown, cam 64 rotates clockwise in the direction of the arrow, FIGURES 2, 3, and 5.

Figure 4:
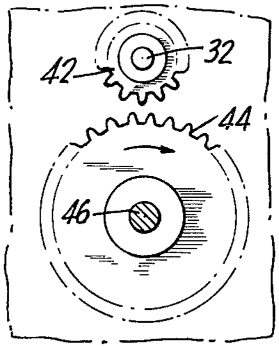
FIGURE 4 is a cross section taken along line 4—4 of FIGURE 3.
Figure 6:
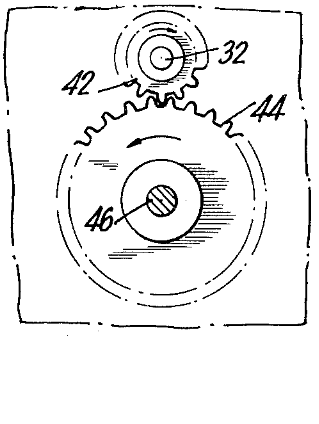
FIGURE 6 is a cross section taken along line 6—6 of FIGURE 5.
Figure 7:
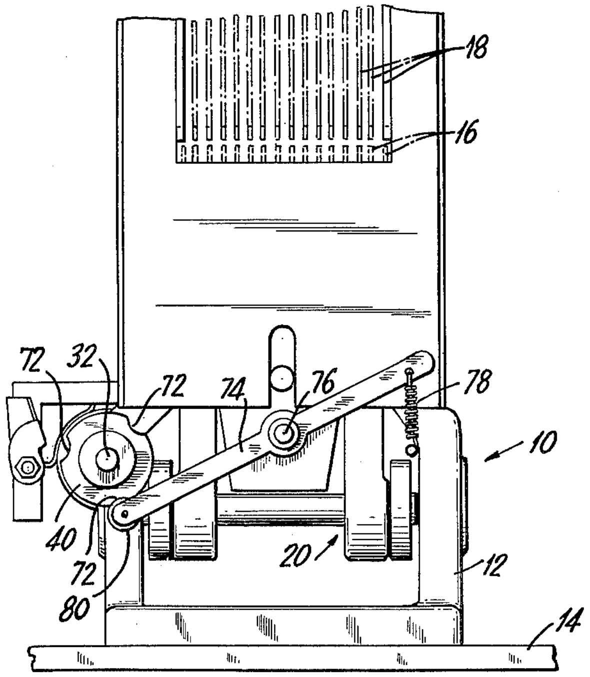
FIGURE 7 is an end view of the tape punch illustrating the detent indexing mechanism.
Figure 8:
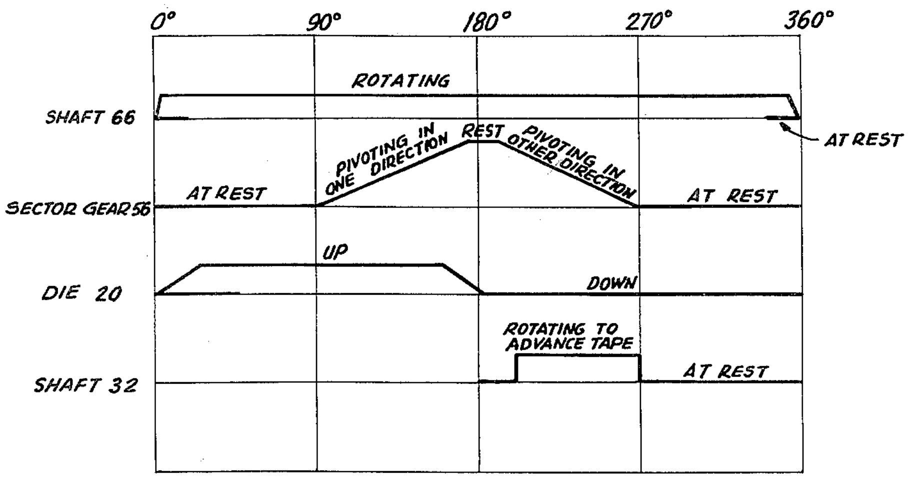
FIGURE 8 is a timing diagram.

In FIGURE 3, cam 64 has rotated one hundred and eighty degrees and sector gear has pivoted clockwise its maximum increment. Accordingly, pinion 54, shaft 46, and pinion 44 rotate clockwise, FIGURE 4. Prior to the pivoting of gear sector 56, die assembly 20 is moved upwardly to perforate the paper tape 22 and consequently shaft 32 with pinion 42 thereon is moved upwardly disengaging pinion 42 from meshing engagement with pinion 44. As shown in the timing diagram in FIGURE 8, shaft 66 and cam 64 rotates three hundred and sixty degrees with each tape feeding operation. After approximately ninety degrees of rotation of cam 64, sector gear starts 56 pivoting in one direction. Prior to the initiation of the pivotal movement of gear sector 56, the rising die assembly 20 moves pinion 42 out of engagement with pinion 44. Pinion 42 remains out of engagement with pinion 44 until the die assembly 20 returns to its downward position at the completion of a punching operation at approximately one hundred an eighty degrees of rotation of cam 64. The continued rotation of cam 64 permits sector gear 56 to rotate in the direction opposite to that of the initial movement thereby rotating pinion 54, shaft 46, and pinion 44 in the opposite direction, or counter-clockwise. Since shaft 32 has moved downwardly and pinion 42 has re-engaged pinion 44, rotation of pinion 44 counter-clockwise rotates pinion 42 clockwise, FIGURE 6. Shaft 32 and spindle 36 rotate accordingly to advance paper tape 22 a predetermined amount equal to the sixteen rows of perforated data.

Means are provided to accurately index the advanced perforated portion of paper tape 22 in proper spaced alignment with the newly advanced imperforate portion of tape 22. Directed toward this end is a cam 40 having three equidistantly spaced recesses 72 therein. Cam 40 is affixed to shaft 32 and rotates therewith. Cooperable with cam 40 is a detent lever 74 that is pivotally mounted on a stud 76 mounted on base 12 of die assembly 20. A spring 78 secured at one end to base 12 and at the other end to lever 74 urges a roller 80 carried by lever 74 into engagement with cam 40. Roller 80 rides the periphery of cam 40 and is adapted to reside in the respective recesses 72. Cam 40 is designed so that the circumferential spacing between the recesses 72 is equal to the linear advancement of the perforated section of paper tape 22. Thus, rotation of shaft 32 during advancement of tape 22 similarly rotates cam 40 and displaces roller 80 out of a recess 72. At the end of the paper tape advancing cycle, the roller 80 has once more entered a recess 72 and spring 78 urges roller 80 to seat accurately in the recess 72. Tape 22 on feed spindle 36 is concurrently indexed in relation to the punch pins 16 in preparation for the succeeding gang perforating operation.

Thus, there has been shown and described a device that accomplishes the objects of the invention while meeting the conditions of practical use.

While a single embodiment of the invention has been shown and described, it will be understood that many modifications and changes may be made without departing from the scope of the invention as defined by the following claims.

The invention claimed is:

1. A tape feed for feeding a gang perforated length of data tape from a reciprocable gang punch and feeding a length of imperforate tape to the gang punch for subsequent gang punching, comprising, a feed spindle mounted on and movable with the reciprocating gang punch, gear means to rotate said spindle, a second gear means adapted to engage and rotate said spindle rotating gear means, means to cyclically rotate said second gear means first in one direction and then in the opposite direction, and said first gear means being disengaged from said second gear means in one direction and engaged with said first gear means during the rotation of said second gear means in the opposite direction.

2. In a gang punch tape feed for feeding data tape from a gang-type punch mounted on a fixed base having a cyclically reciprocating punching chamber, a tape feeding spindle mounted on and reciprocably movable with said punching chamber, means to actuate said spindle mounted on the fixed base, means to connect said spindle to said spindle actuating means, and means to disconnect said connecting means during the reciprocating movement of said spindle.

3. In a gang punch tape feed for feeding a predetermined length of data tape from a gang-type punch having a fixed base and reciprocating punching chamber, said tape feed being adapted to move imperforate tape into punching relation with selected punches and move the perforated tape away from the selected punches with each cycle of operation, tape feeding means movable with said movable punching chamber, means mounted on said fixed base adapted to engage and actuate said tape feeding means upon the punching chamber moving the tape away from the selected punches, to advance the tape said predetermined length, rotary tape feeding means mounted for reciprocal movement with the punching chamber and adapted to rotate to feed a length of tape, rotary drive means mounted on said base adapted to engage said tape feeding means when said punching chamber has moved the perforated tape away from the selected punches, and means to arrest the rotation of said drive means when the length of tape feed by said rotary feed means equals said predetermined length.

References Cited by the Examiner

UNITED STATES PATENTS

| | | | |
|---|---|---|---|
| 779,153 | 1/05 | Franke et al. | 234—99 |
| 1,429,719 | 9/22 | Day | 234—100 X |
| 1,443,312 | 1/23 | Day | 234—100 X |
| 2,353,034 | 7/44 | Holt | 234—51 |
| 3,112,871 | 12/63 | Bogan et al. | 234—129 |
| 3,124,302 | 3/64 | Arnett et al. | 234—128 X |

WILLIAM W. DYER, Jr., *Primary Examiner.*

J. SPENCER OVERHOLSER, ANDREW R. JUHASZ, *Examiners.*